(12) United States Patent
Lloyd

(10) Patent No.: US 10,326,539 B2
(45) Date of Patent: Jun. 18, 2019

(54) TEST SYSTEM AND TEST METHOD

(71) Applicant: Rohde & Schwarz GmbH & Co. KG, München (DE)

(72) Inventor: Gareth Lloyd, München (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 1 day.

(21) Appl. No.: 15/485,792

(22) Filed: Apr. 12, 2017

(65) Prior Publication Data

US 2018/0302178 A1 Oct. 18, 2018

(51) Int. Cl.

| H04B 17/12 | (2015.01) |
| H04B 17/00 | (2015.01) |
| H04L 12/26 | (2006.01) |
| H04B 17/10 | (2015.01) |
| H04J 9/00 | (2006.01) |
| H04B 17/19 | (2015.01) |
| H04B 7/06 | (2006.01) |

(52) U.S. Cl.
CPC ......... H04B 17/12 (2015.01); H04B 17/0085 (2013.01); H04B 17/102 (2015.01); H04L 43/18 (2013.01); *H04B 7/0613* (2013.01); *H04B 17/19* (2015.01); *H04J 9/00* (2013.01); *H04L 43/50* (2013.01)

(58) Field of Classification Search
CPC .... H04B 17/12; H04B 17/0085; H04B 17/00; H04B 17/19; H04B 7/0417; H04B 7/0617; H04B 7/02; H04B 3/46; H04L 43/18; H04L 43/00; H04L 43/50; H04L 2012/6497; H04J 9/00; H04J 2203/0062; H04W 52/52; H04W 24/00
See application file for complete search history.

(56) References Cited

U.S. PATENT DOCUMENTS

| 5,530,449 A | * | 6/1996 | Wachs | H01Q 3/267 342/174 |
| 6,133,868 A | * | 10/2000 | Butler | H01Q 3/267 342/165 |
| 6,252,542 B1 | * | 6/2001 | Sikina | H01Q 3/267 342/174 |
| 7,058,425 B1 | * | 6/2006 | Takakusaki | H01Q 3/26 455/561 |
| 7,106,249 B2 | * | 9/2006 | Kubo | H01Q 3/267 342/165 |
| 7,297,877 B2 | * | 11/2007 | Chiu | H05K 1/115 174/262 |

(Continued)

FOREIGN PATENT DOCUMENTS

| EP | 2977323 | * | 2/2014 | ............... H01Q 3/26 |
| EP | 2911323 A1 | | 8/2015 | |

*Primary Examiner* — Warner Wong
(74) *Attorney, Agent, or Firm* — Shumaker & Sieffert, P.A.

(57) ABSTRACT

A test system for testing an array antenna under test with at least two antenna elements comprises a signal generator that generates a test signal, a signal splitter that splits the test signal into a plurality of antenna source signals for the single antenna elements, and a vector multiplier for each one of the antenna source signals, wherein the vector multipliers each adjust the amplitude and/or phase of the respective antenna source signal according to predetermined adjustment parameters and wherein output ports of the vector multipliers are connected to respective ones of the antenna elements.

16 Claims, 4 Drawing Sheets

(56) References Cited

U.S. PATENT DOCUMENTS

| | | | | |
|---|---|---|---|---|
| 8,477,871 B2* | 7/2013 | Neumann | H03F 1/3247 | 375/295 |
| 9,113,346 B2* | 8/2015 | Pivit | H01Q 3/267 | |
| 9,742,508 B1* | 8/2017 | Kyosti | H04B 17/12 | |
| 9,948,408 B1* | 4/2018 | Gomadam | H04B 17/12 | |
| 2003/0050099 A1* | 3/2003 | Izadpanah | H04B 7/1555 | 455/562.1 |
| 2004/0087294 A1* | 5/2004 | Wang | H04B 7/086 | 455/276.1 |
| 2005/0176376 A1* | 8/2005 | Liu | G01R 29/0821 | 455/67.16 |
| 2005/0239419 A1* | 10/2005 | Fudaba | H04B 17/12 | 455/101 |
| 2006/0215744 A1* | 9/2006 | O'Neill | H04L 1/206 | 375/224 |
| 2008/0232815 A1* | 9/2008 | Shioiri | H04B 10/5561 | 398/140 |
| 2010/0123471 A1* | 5/2010 | Olgaard | H04L 1/06 | 324/750.3 |
| 2012/0001810 A1* | 1/2012 | Soualle | G01S 19/02 | 343/703 |
| 2012/0269288 A1* | 10/2012 | Olgaard | H04L 1/24 | 375/296 |
| 2014/0133470 A1* | 5/2014 | McGowan | H04W 72/082 | 370/336 |
| 2014/0133543 A1* | 5/2014 | Da Silveira | H04L 25/03949 | 375/232 |
| 2015/0244430 A1* | 8/2015 | Shattil | H04B 1/0003 | 370/254 |
| 2016/0218428 A1* | 7/2016 | Jung | H01Q 3/267 | |
| 2017/0223639 A1* | 8/2017 | Golan | H04W 52/248 | |
| 2017/0244499 A1* | 8/2017 | Gallhauser | H04B 17/318 | |
| 2017/0324161 A1* | 11/2017 | Kareisto | H01Q 3/267 | |
| 2018/0102859 A1* | 4/2018 | Rowell | H04B 17/30 | |
| 2018/0136313 A1* | 5/2018 | Genghammer | G01S 7/4026 | |
| 2018/0262279 A1* | 9/2018 | Bartko | H04B 17/12 | |
| 2018/0294564 A1* | 10/2018 | Kim | G01S 7/4052 | |

\* cited by examiner

TEST SYSTEM AND TEST METHOD

TECHNICAL FIELD

The present invention relates to a test system for testing an array antenna under test with at least two antenna elements. The present invention further relates to a respective test method.

BACKGROUND

Although applicable in principal to any system that uses array antennas or antenna arrays, the present invention and its underlying problem will be hereinafter described in combination with test systems for array antennas.

In modern communication technologies active beam forming is becoming increasingly important e.g. to increase the capacity of wireless data connections.

Therefore, it is necessary to develop and thoroughly test new designs for array antennas. For testing such antennas multiple source signals with explicitly defined phases and amplitudes are necessary.

With common test equipment one signal source must be provide for every antenna element of the array antenna.

Against this background, the problem addressed by the present invention is providing a simplified test setup.

SUMMARY

The present invention solves this object by a test system with the features of claim 1 and a test method with the features of claim 14.

Accordingly it is provided:

A test system for testing an array antenna under test with at least two antenna elements, the test system comprising a signal generator that generates a test signal, a signal splitter that splits the test signal into a plurality of antenna source signals for the single antenna elements, wherein the number of antenna source signals may be equal to number of single antenna elements, and a vector multiplier for each one of the antenna source signals, wherein the vector multipliers each adjust the amplitude and/or phase of the respective antenna source signal according to predetermined adjustment parameters and wherein output ports of the vector multipliers are connected to respective ones of the antenna elements.

Further it is provided:

A test method for testing an array antenna under test with at least two antenna elements, the test method comprising generating a test signal, splitting the test signal into a plurality of antenna source signals for the single antenna elements, adjusting the amplitude and/or phase of the respective antenna source signals for the antenna elements according to predetermined adjustment parameters, and providing the adjusted antenna source signals to the respective ones of the antenna elements.

As already explained above, testing of phased array antennas usually requires a complex setup with a plurality of specifically calibrated signal sources.

The present invention in contrast is based on the idea of using a single signal source with corresponding signal modifications to generate the required output signals based on the single source signal.

Therefore in the present invention a single signal generator is provided that generates a single test signal. This test signal is then provided to a signal splitter that splits the test signal into a plurality of antenna source signals. The number of output ports of the signal splitter may e.g. be eight or sixteen or any other arbitrary number, and may also be adapted to the number of antenna elements of the array antenna. It is understood however, that the signal splitter may also comprise more output ports than the array antenna has antenna elements. The unused output ports may simply remain unconnected.

After the test signal is split into a plurality of antenna source signals the antenna source signals are all identical. However to test e.g. the beamforming capabilities of the array antenna, every antenna element has to be fed with a signal that comprises an individual phase and/or amplitude. In sum the RF signals emitted by all the antenna elements will then overlay and form a wavefront with a desired directivity.

Therefore, the present invention provides the vector multipliers. Vector multipliers are devices that may receive an input signal and may change the phase and/or amplitude of the input signal according to predetermined adjustment parameters.

By providing a vector multiplier for every antenna source signal it is therefore possible to modify the single antenna source signals according to the phase and/or amplitude as set with the predetermined adjustment parameters. The predetermined adjustment parameters may e.g. be user provided or predetermined for a specific test setup. The predetermined adjustment parameters may be constant for single test cases or may be variable to perform dynamic tests.

The antenna source signals provided by the single vector multipliers may then be directly fed to the respective antenna elements that will emit respective RF signals. It is clear that the signal generator may generate the test signal with the frequencies required for the RF signals.

With the help of the present invention array antennas may be easily provided with the necessary input signals even if only one single signal source is available.

Therefore, simple test setups with e.g. low-end test equipment will still allow testing complex beam forming antennas.

Further embodiments of the present invention are subject of the further subclaims and of the following description, referring to the drawings.

In a possible embodiment, the test system may further comprise a signal coupler for every vector multiplier that couples out part of each adjusted antenna source signal, and a controller that corrects the adjustment parameters for the single vector multipliers based on the coupled out part of the respective adjusted antenna source signals and provides the corrected adjustment parameters to the respective ones of the vector multipliers.

The signal couplers will couple out a part of every antenna source signal that may then be analyzed to verify that the phase and/or amplitude of the respective adjusted antenna source signal is as specified or required.

The controller may e.g. comprise an automatic signal evaluation for the coupled out parts of the adjusted antenna source signals and automatically correct the predetermined adjustment parameters accordingly. As an alternative, the controller may comprise a user interface to show the coupled out parts of the adjusted antenna source signals or the properties of these signals to the user. The user may then manually set the predetermined adjustment parameters.

With the help of the couplers and the controller the signal quality can be assured. The vector multipliers may e.g. provide temperature induced drifts of the phases or amplitudes of the antenna source signals. Without the couplers and the controller the signal emitted by the array antenna, i.e. the single antenna elements, may therefore deviate from the desired signal. However, the couplers and the controller provide a kind of closed-loop control system for adjusting the vector multipliers accordingly.

In a possible embodiment, the test system may further comprise a vector network analyzer, wherein the controller and the signal generator may be arranged in the vector network analyzer.

Vector network analyzers are complex measurement devices that may provide a plurality of functions. Some vector network analyzers may comprise only a single signal source and may therefore not serve to test array antennas without the present invention. However, with the present invention it is now possible to use such vector network analyzers with a single signal source to perform measurements on array antennas.

In a possible embodiment, the test system may further comprise a phase discriminator receiver that receives the coupled out parts of the adjusted antenna source signals and determines the phase and/or amplitude of the respective antenna source signals, wherein the controller corrects the adjustment parameters based on the respective determined phases and/or amplitudes.

The phase discriminator receiver may e.g. comprise a phase detector for detecting the phase of the single antenna source signals compared to the original test signal. The phase discriminator receiver may be a discrete device. As an alternative the phase discriminator receiver may at least in part be implemented as a computer program product that is executed by a processor. It is understood, that the phase discriminator receiver may comprise any other elements that are necessary to handle the coupled out parts of the adjusted antenna source signals, like e.g. A/D converters, amplifiers, filters and the like.

The phase discriminator receiver may comprise single input ports for all coupled out parts of the adjusted antenna source signals. Therefore, if eight antenna source signals are generated the phase discriminator receiver may comprise eight input ports. If for example the input ports provide more than one signal input, the number of antenna source signals per port increases accordingly.

In a possible embodiment, the test system may further comprise a computer, wherein the controller may be arranged in the computer and the computer may comprise a control interface for providing the corrected adjustment parameters to the single vector multipliers.

The test system may comprise a separate computer. Such a computer may e.g. be coupled via a network connection to the other elements of the test system. The computer may e.g. serve as user interface and control center for the test system and the other elements of the test system may provide measurement and other data to the computer via the network. A computer program may be provided on the computer that automatically calculates the corrected adjustment parameters and provides these to the single vector multipliers.

Alternatively a user may perform measurements on the coupled out parts of the respective antenna source signals and correct the adjustment parameters manually.

In a possible embodiment, the phase discriminator receiver may be arranged in the vector network analyzer.

Usually vector network analyzers comprise a plurality of input ports. Such input ports will comprise phase discriminator receivers. Therefore, such phase discriminator receivers may be used to measure the coupled out parts of the adjusted antenna source signals. Especially in combination with the controller and the signal source being arranged in the vector network analyzer a very compact test system may be provided.

In vector network analyzers the input ports may provide direct access ports for accessing various input and output signals of the single input ports.

Under normal operating conditions a vector network analyzer may e.g. comprise direct access to a SOURCE OUT signal that comes from the respective signal source, the REF IN signal may refer to the reference signal and the MEAS IN may refer to the measured signal.

The two input signal accesses may be used with the present invention to both receive one of the antenna source signals, i.e. the respective coupled out parts. Therefore, a vector network analyzer with only 4 ports may be used to handle eight antenna source signals.

In a possible embodiment, the test system may further comprise a multiplexer that multiplexes the coupled out parts of the respective adjusted antenna source signals, wherein the phase discriminator receiver may comprise a de-multiplexer that de-multiplexes the coupled out parts of the adjusted respective antenna source signals prior to determining the phases and/or amplitudes of the respective antenna source signals.

By multiplexing the coupled out parts of the adjusted antenna source signals becomes unnecessary to provide the phase discriminator receiver with an increased number of input ports. Instead a single input port of the phase discriminator receiver will suffice to handle an arbitrary number of antenna source signals.

Multiplexing in this context may e.g. refer to a time-domain multiplexing, a frequency-domain multiplexing or a code multiplexing.

In a possible embodiment, the test system may further comprise an amplifier arranged between the signal generator and the signal splitter for amplifying the test signal.

With a single amplifier upstream of the signal splitter, e.g. before the test signal enters the signal splitter, the signal level will be boosted for all antenna elements.

In a possible embodiment, the signal source may comprise a signal synthesizer that generates a continuous wave test signal.

A continuous wave test signal is a very simple test signal that may easily be evaluated on the receiver side.

In a possible embodiment, the signal source may comprise a signal modulator that generates a modulated test signal.

The modulation may be performed according to a pre-defined modulation scheme or communication standard. For example, the modulation may be performed as ASK, like 2-ASK, 4-ASK, or as QAM, e.g. 4QAM to 4096QAM, OFDM modulation or the like.

With a modulated test signal a specific behavior of an array antenna may be evaluated e.g. for different communication systems, like e.g. WIFI, 5G, LTE or the like.

In a possible embodiment, the test system may further comprise a vector multiplier array, wherein the single vector multipliers may be arranged in the vector multiplier array.

Instead of providing single vector multipliers a simplified set-up may comprise the vector multiplier array instead.

In a possible embodiment, at least one of the vector multipliers may comprise a gain adjuster and a separate phase adjuster.

Gain adjusters as well as phase adjusters may be provided as single elements of low complexity.

In a possible embodiment, the test system may further comprise at least one field level sensor, e.g. a power meter, for measuring the signals emitted by the single antenna elements based on the antenna source signals.

The test system with the field level sensors may be used to generate the necessary antenna source signals and at the same time may be used to measure the signals emitted by the array antenna. The field level sensor may e.g. comprise respective antenna arrangements, like e.g. reference horn antennas or power meters. It is further understood that the field level sensor may comprise any further element that is necessary to measure field levels, like e.g. an attached measurement device, like e.g. an oscilloscope or the like. The field level sensor may also be coupled to an input port of a vector network analyzer.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

Figure 1:
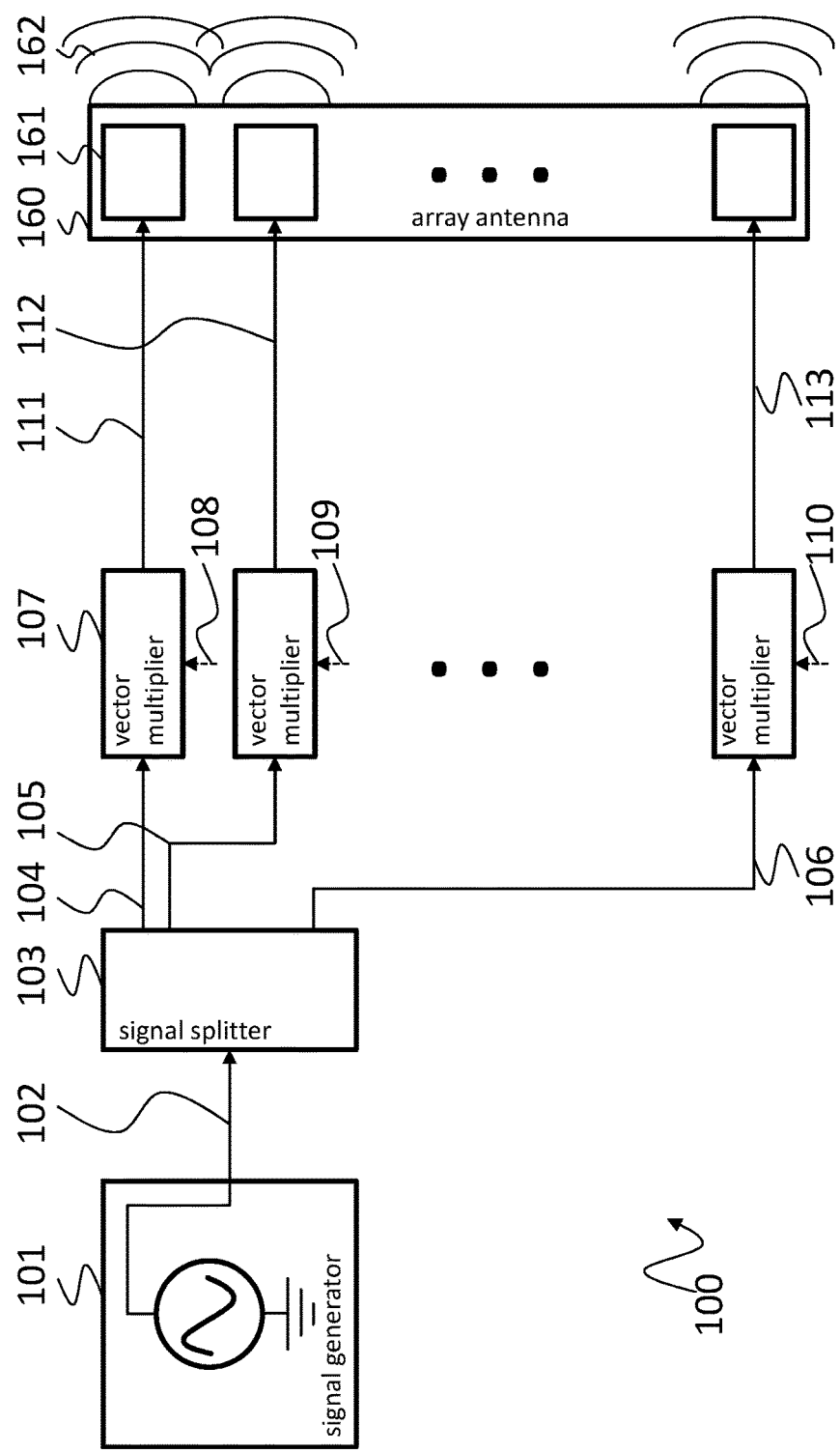
FIG. 1 shows a block diagram of an embodiment of a test system according to the present invention.

The appended drawings are intended to provide further under-standing of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated other-wise.

DETAILED DESCRIPTION OF THE DRAWINGS

FIG. 1 shows a block diagram of a test system 100. The test system 100 comprises a signal generator 101 that is coupled to a signal splitter 103. The signal splitter 103 is coupled to a plurality of vector multipliers 107. Since the vector multipliers 107 may be identical, for sake of clarity only the first vector multiplier 107 is provided with a reference sign. The outputs of the vector multipliers 107 are each connected to an antenna element 161 of the array antenna 160. As with the vector multipliers 107, only the first antenna element 161 is provided with a reference sign. Even if only three vector multipliers 107 and antenna elements 161 are shown, it is understood that any number of vector multipliers 107 and antenna elements 161 is possible.

The signal generator 101 generates a single test signal 102 and provide this test signal 102 to the signal splitter 103. The signal splitter 103 splits this test signal 102 into as many antenna source signals 104, 105, 106 as there are vector multipliers 107. The single vector multipliers 107 each receive predetermined adjustment parameters 108, 109, 110 and modify or adjust the respective antenna source signal 104, 105, 106 according to the adjustment parameters 108, 109, 110.

Modifying or adjusting in this context refers to modifying or adjusting the phase and/or amplitude of the single antenna source signals 104, 105, 106. The adjusted antenna source signals 111, 112, 113 are then provided to the single antenna elements 161, which will emit respective RF signals 162. The RF signals 162 may be sensed with respective field level sensors, like e.g. power meters (not separately shown) to evaluate the beamforming capabilities of the array antenna 160.

The adjustment parameters 108, 109, 110 may be predetermined for a specific measurement task, e.g. to form a specific beam pattern with the array antenna 160.

Figure 2:
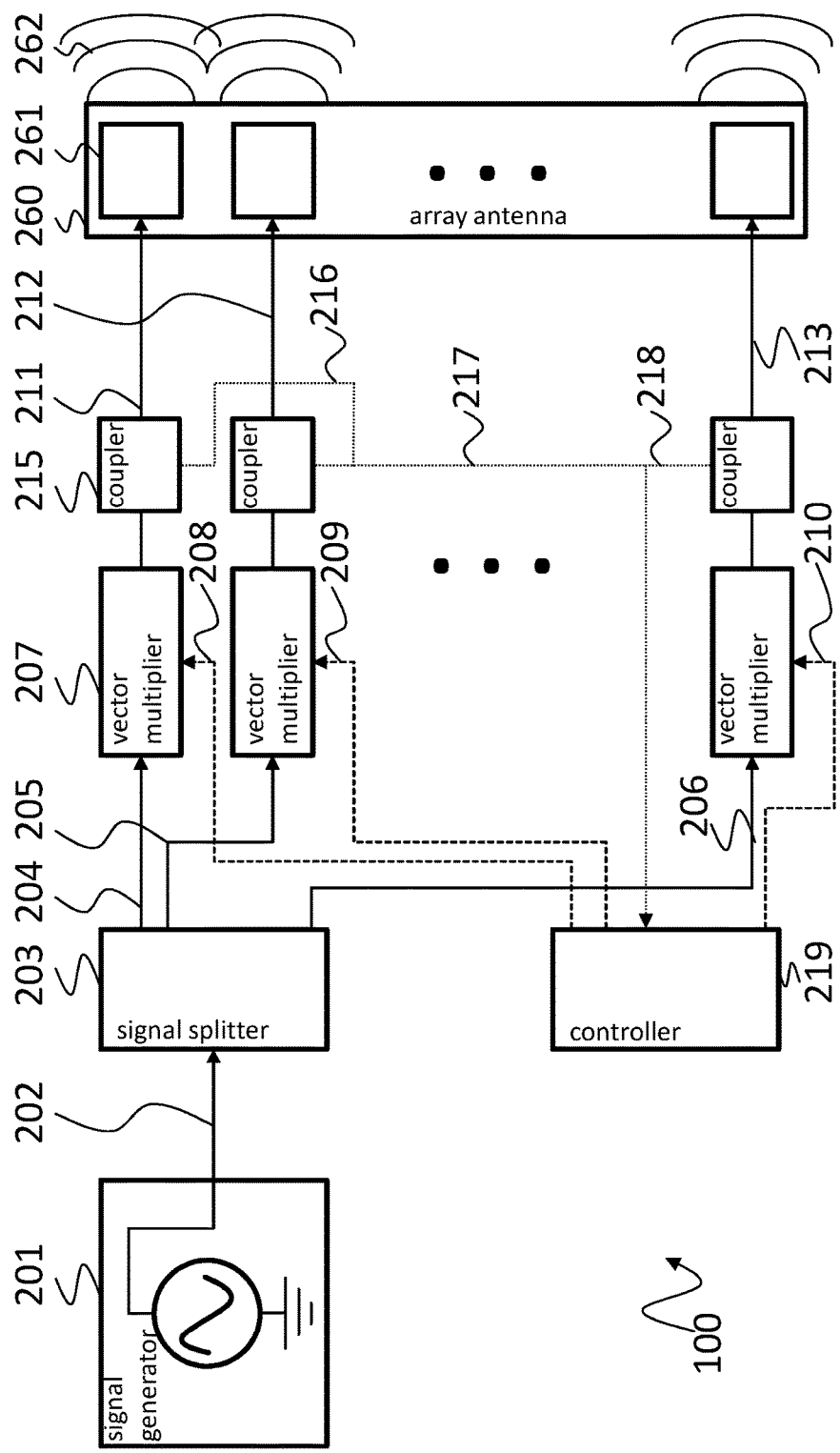
FIG. 2 shows a block diagram of another embodiment of a test system according to the present invention.

In FIG. 2 a test system 200 is shown that allows permanently controlling and correcting the adjustment parameters 208, 209, 210. The test system 200 is based on the test system 100 and also comprises a signal generator 201 that is coupled to a signal splitter 203. The signal splitter 203 is coupled to a plurality of vector multipliers 207. The outputs of the vector multipliers 207 are each connected to an antenna element 261 of the array antenna 260. In the following only the differences between the test system 200 and the test system 100 will be described.

The test system 200 comprises a signal coupler 215 for every one of the adjusted antenna source signals 211, 212, 213. The signal couplers 215 may e.g. each comprise a power splitter or directional coupler. The signal couplers 215 couple out part of the adjusted antenna source signals 211, 212, 213. The remaining parts of the adjusted antenna source signals 211, 212, 213 are provided to the antenna element 261.

The coupled out parts of the adjusted antenna source signals 216, 217, 218 are then provided to a controller 219. The controller 219 analyzes the adjusted antenna source signals 211, 212, 213 and corrects the adjustment parameters 208, 209, 210 accordingly. The controller 219 may e.g. determine the phase and/or amplitude of the adjusted antenna source signals 211, 212, 213 and compare the phase and/or amplitude to respective preset values. The deviations of the phases and/or amplitudes will then determine the amount of correction of the adjustment parameters 208, 209, 210.

With the signal couplers 215 and the controller 219 the test system 200 provides a kind of closed-loop control for the adjusted antenna source signals 211, 212, 213 that ensures that the single adjusted antenna source signals 211, 212, 213 comprise the phase and/or amplitude that is required in the respective test case.

Figure 3:
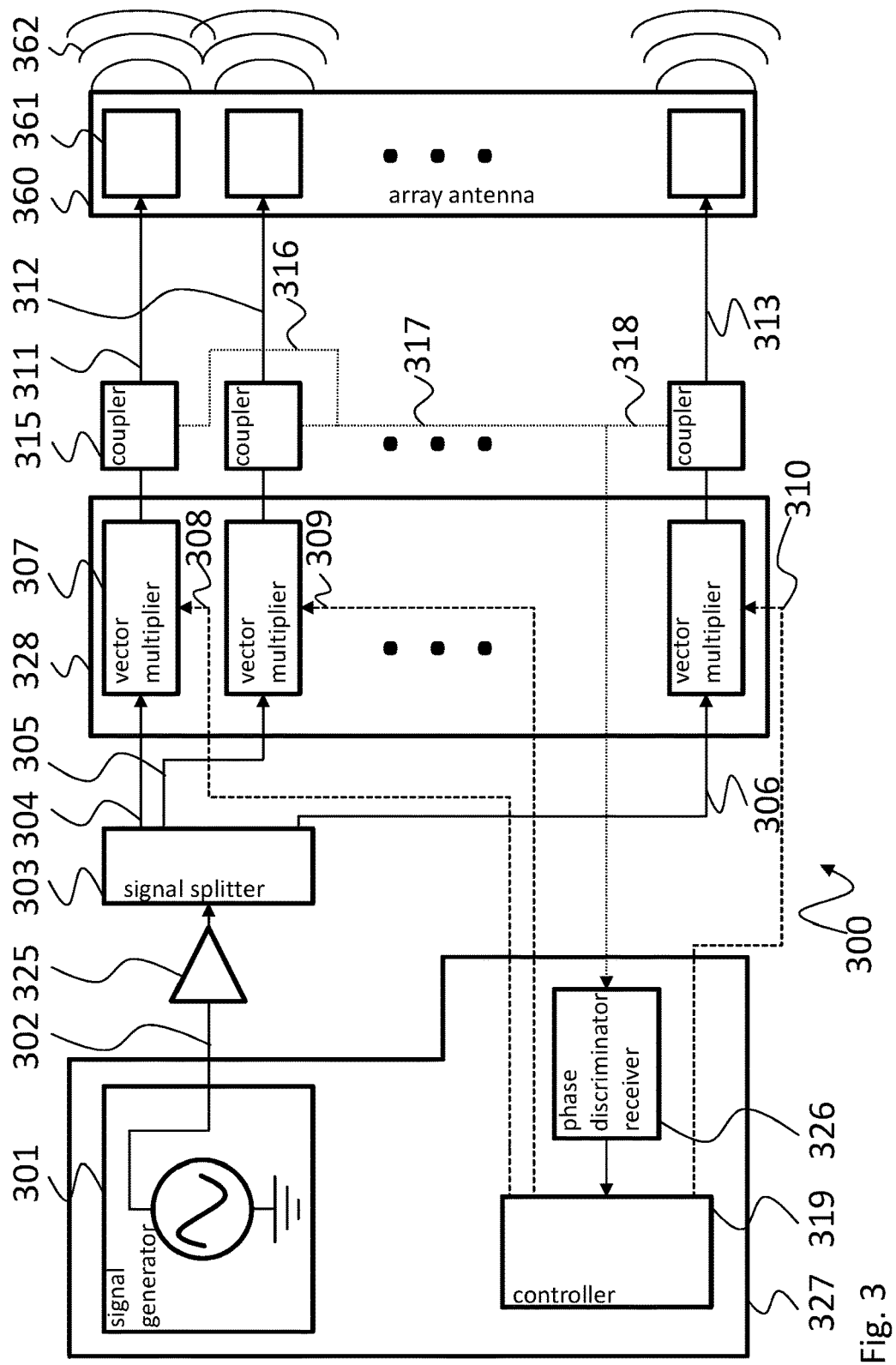
FIG. 3 shows a block diagram of another embodiment of a test system according to the present invention.

FIG. 3 shows a block diagram of another test system 300. The test system 300 is based on the test system 200 and therefore also comprises a signal generator 301 that is coupled to a signal splitter 303. The signal splitter 303 is coupled to a plurality of vector multipliers 307. The outputs of the vector multipliers 307 are each connected to an antenna element 361 of the array antenna 360. The test system 300 also comprises the signal coupler 315 for every one of the adjusted antenna source signals 311, 312, 313 and the controller 319.

In the following only the differences between the test system 300 and the test system 200 will be described.

In the test system 300 an amplifier 325 is arranged between the signal generator 301 and the signal splitter 303. The amplifier 325 may e.g. be used to compensate the losses caused by the signal couplers 315. By providing the amplifier 325 upstream of the signal splitter 303 a single amplifier 325 can be used to amplify all adjusted antenna source signals 311, 312, 313 that are provided to the antenna elements 361.

In addition, the test system 300 comprises a phase discriminator receiver 326 that receives the coupled out parts of the adjusted antenna source signals 316, 317, 318 and determines the phase and/or amplitude of the respective adjusted antenna source signals 311, 312, 313. The phase discriminator receiver 326 provides the information about the phases and/or amplitudes of the adjusted antenna source signals 311, 312, 313 to the controller 319 that corrects the adjustment parameters 308, 309, 310 based on the determined phases and/or amplitudes.

Further, just as an example in the test system 300 the signal generator 301, the phase discriminator receiver 326 and the controller 319 are provided in a vector network analyzer 327. Further, the vector multipliers 307 are provided in a vector multiplier array 328. It is understood that any other setup with the required components may also be used.

Although not shown, it is understood that the test systems 100, 200, 300 may also comprise a field level sensor for measuring the signals 362 emitted by the single antenna elements 361 based on the adjusted antenna source signals 311, 312, 313. Such a field level sensor may e.g. also be connected to the vector network analyzer 327.

Further, it is understood, that multiple test systems may be combined to provide the required number of adjusted antenna source signals to the antenna elements. For example two vector network analyzers 327, each with a single signal generator 301 and two input ports, may be combined to provide eight regulated adjusted antenna source signals 311, 312, 313. Any other combination is also possible.

Figure 4:
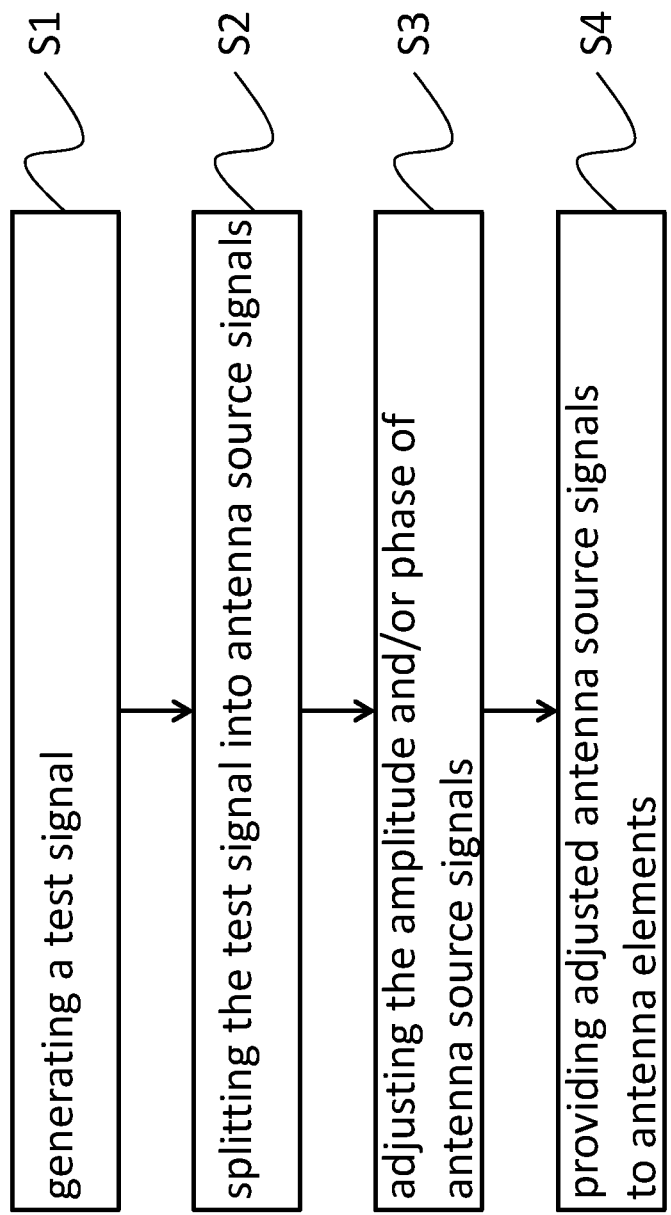
FIG. 4 shows a flow diagram of an embodiment of a test method according to the present invention.

FIG. 4 shows a flow diagram of a test method according to the present invention for testing an array antenna 160, 260, 360 under test with at least two antenna elements 161, 261, 361.

For sake of clarity in the following description of the method based FIG. 4 the reference signs used above in the description of apparatus based FIGS. 1-3 will be maintained.

The test method comprises generating S1 a test signal 102, 202, 302, splitting S2 the test signal 102, 202, 302 into a plurality of antenna source signals 104, 105, 106, 204, 205, 206, 304, 305, 306 for the single antenna elements 161, 261, 361, adjusting S3 the amplitude and/or phase of the respective antenna source signals 104, 105, 106, 204, 205, 206, 304, 305, 306 for the antenna elements 161, 261, 361 according to predetermined adjustment parameters 108, 109, 110, 208, 209, 210, 308, 309, 310 and providing S4 the adjusted antenna source signals 104, 105, 106, 204, 205, 206, 304, 305, 306 to the respective ones of the antenna elements 161, 261, 361.

Generating S1 a test signal 102, 202, 302 may e.g. comprise generating a continuous wave test signal 102, 202, 302 or generating a modulated test signal 102, 202, 302.

In addition the test method may comprise amplifying the test signal 102, 202, 302 prior to splitting S2, and measuring the signals emitted by the single antenna elements 161, 261, 361 based on the adjusted antenna source signals 111, 112, 113, 211, 212, 213, 311, 312, 313.

The above features allow providing simple non-controlled adjusted antenna source signals 111, 112, 113, 211, 212, 213, 311, 312, 313 to the antenna elements 161, 261, 361.

With the below features fine grained control of the adjusted antenna source signals 104, 105, 106, 204, 205, 206, 304, 305, 306 will also be possible.

The test method may e.g. further comprise coupling out a part of each adjusted antenna source signal 216, 217, 218, 316, 317, 318 and correcting the adjustment parameters 108, 109, 110, 208, 209, 210, 308, 309, 310 for the single vector multipliers 107, 207, 307 based on the coupled out part of the respective adjusted antenna source signals 216, 217, 218, 316, 317, 318.

Correcting the adjustment parameters 108, 109, 110, 208, 209, 210, 308, 309, 310 and generating the test signal 102, 202, 302 may e.g. be performed in a vector network analyzer 327. As an alternative correcting the adjustment parameters 108, 109, 110, 208, 209, 210, 308, 309, 310 may also be performed in a computer or by a user.

For correcting the adjustment parameters 108, 109, 110, 208, 209, 210, 308, 309, 310 the test method may also comprise receiving the coupled out parts of the adjusted antenna source signals 216, 217, 218, 316, 317, 318 and determining the phase and/or amplitude of the respective adjusted antenna source signals 111, 112, 113, 211, 212, 213, 311, 312, 313. Correcting the adjustment parameters 108, 109, 110, 208, 209, 210, 308, 309, 310 may then be performed based on the respective determined phases and/or amplitudes. Determining the phase and/or amplitude of the respective adjusted antenna source signals 111, 112, 113, 211, 212, 213, 311, 312, 313 may also be performed in the vector network analyzer 327.

In order to reduce the number of input ports needed e.g. at the vector network analyzer 327 the method may comprise multiplexing the coupled out parts of the respective adjusted antenna source signals 216, 217, 218, 316, 317, 318, and de-multiplexing the coupled out parts of the respective adjusted antenna source signals 216, 217, 218, 316, 317, 318 prior to determining the phases and/or amplitudes of the respective adjusted antenna source signals 111, 112, 113, 211, 212, 213, 311, 312, 313.

Since a plurality of vector multipliers 107, 207, 307 may be needed in the present invention, the single vector multipliers 107, 207, 307 for adjusting the amplitude and/or phase of the respective antenna source signal 104, 105, 106, 204, 205, 206, 304, 305, 306 may be provided in a vector multiplier array 328. The single vector multipliers 107, 207, 307 may e.g. comprise a gain adjuster and a separate phase adjuster.

Although specific embodiments have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS 100, 200, 300 test system
101, 201, 301 signal generator
102, 202, 302 test signal
103, 203, 303 signal splitter
104, 105, 106 antenna source signal
204, 205, 206 antenna source signal
304, 305, 306 antenna source signal
107, 207, 307 vector multiplier
108, 109, 110 adjustment parameters
208, 209, 210 adjustment parameters
308, 309, 310 adjustment parameters
111, 112, 113 adjusted antenna source signal
211, 212, 213 adjusted antenna source signal
311, 312, 313 adjusted antenna source signal
215, 315 signal coupler
216, 217, 218 part of antenna source signal
316, 317, 318 part of antenna source signal
219, 319 controller
325 amplifier
326 phase discriminator receiver
327 vector network analyzer
328 vector multiplier array
160, 260, 360 array antenna
161, 261, 361 antenna elements

The invention claimed is:

1. A test system for testing an array antenna under test with at least two antenna under test with at least two antenna elements, the test system comprising:
a signal generator that generates a test signal,
a signal splitter that splits the test signal into a plurality of antenna source signals for the single antenna elements,
a plurality of vector multipliers coupled to the signal splitter, the plurality of vector multipliers including a vector multiplier for each one of the antenna source signals, wherein the vector multipliers each adjust the amplitude and/or phase of the respective antenna source signal according to predetermined adjustment parameters and wherein output ports of the vector multipliers are connected to respective ones of the antenna elements,
a signal coupler for each of the vector multipliers that couples out part of each adjusted antenna source signal, and a controller that corrects the adjustment parameters for the single vector multipliers based on the coupled out part of the respective adjusted antenna source signals and provides the corrected adjustment parameters to the respective ones of the vector multipliers,
a phase discriminator receiver that receives the coupled out parts of the adjusted antenna source signals and determines the phase and/or amplitude of the respective adjusted antenna source signals, wherein the controller corrects the adjustment parameters based on the respective determined phases and/or amplitudes, and
a multiplexer that multiplexes the coupled out parts of the respective adjusted antenna source signals, wherein the phase discriminator comprises a de-multiplexer that de-multiplexes the coupled out parts of the respective adjusted antenna source signals prior to determining the phases and/or amplitude of the respective adjusted antenna source signals.

2. The test system of claim 1, comprising a vector network analyzer, wherein the controller and the signal generator are arranged in the vector network analyzer.

3. The test system of claim 1, comprising a computer, wherein the controller is arranged in the computer and the computer comprises a control interface for providing the corrected adjustment parameters to the single vector multipliers.

4. The test system of claim 2, wherein the phase discriminator receiver is arranged in the vector network analyzer.

5. The test system of claim 1, comprising an amplifier arranged between the signal generator and the signal splitter for amplifying the test signal.

6. The test system of claim 1, wherein the signal source comprises a signal synthesizer that generates a continuous wave test signal.

7. The test system of claim 1, wherein the signal source comprises a signal modulator that generates a modulated test signal.

8. The test system of claim 1, comprising a vector multiplier array, wherein the single vector multipliers are arranged in the vector multiplier array.

9. The test system of claim 1, wherein at least one of the vector multipliers comprises a gain adjuster and a separate phase adjuster.

10. The test system of claim 1, comprising at least one field level sensor for measuring RF signals emitted by the single antenna elements based on the adjusted antenna source signals.

11. A test method for testing an array antenna under test with at least two antenna elements, the test method comprising:
generating a test signal,
splitting the test signal into a plurality of antenna source signals for the single antenna elements,
adjusting, using respective vector multipliers, the amplitude and/or phase of the respective antenna source signals for the antenna elements according to predetermined adjustment parameters,
providing the adjusted antenna source signals to the respective ones of the antenna elements,
coupling out part of each antenna source signal,
receiving the coupled out parts of the adjusted antenna source signals,
multiplexing the coupled out parts of the respective adjusted antenna source signals, and de-multiplexing the coupled out parts of the respective adjusted antenna source signals prior to determining the phases and/or amplitudes of the respective adjusted antenna source signals, determining the phase and/or amplitude of the respective adjusted antenna source signals, and correcting the adjustment parameters for the single vector multipliers based on the coupled out part of the respective adjusted antenna source signals and based on the respective determined phases and/or amplitudes.

12. The test method of claim 11, wherein correcting the adjustment parameters and generating the test signal is performed in a vector network analyzer; or wherein correcting the adjustment parameters is performed in a computer.

13. The test method of claim 12, wherein determining the phase and/or amplitude of the respective adjusted antenna source signals is performed in the vector network analyzer.

14. The test method of claim 11, wherein generating a test signal comprises generating a continuous wave test signal; and/or wherein generating a test signal comprises generating a modulated test signal.

15. The test method of claim 11, comprising providing single vector multipliers for adjusting the amplitude and/or phase of the respective adjusted antenna source signals in a vector multiplier array, especially wherein at least one of the vector multipliers comprises a gain adjuster and a separate phase adjuster.

16. The test method of claim 11, comprising amplifying the test signal prior to splitting; and/or comprising measuring the signals emitted by the single antenna elements based on the adjusted antenna source signals.

* * * * *